(12) United States Patent
Choquet

(10) Patent No.: US 11,953,923 B2
(45) Date of Patent: Apr. 9, 2024

(54) SUBSIDIARY INTERACTION OF CONTROLLERS

(71) Applicant: Barksdale, Inc., Los Angeles, CA (US)

(72) Inventor: Pascal Choquet, Oberursel (DE)

(73) Assignee: Barksdale, Inc., Los Angeles, CA (US)

( * ) Notice: Subject to any disclaimer, the term of this patent is extended or adjusted under 35 U.S.C. 154(b) by 0 days.

(21) Appl. No.: 17/640,141

(22) PCT Filed: Sep. 3, 2020

(86) PCT No.: PCT/US2020/049199
§ 371 (c)(1),
(2) Date: Mar. 3, 2022

(87) PCT Pub. No.: WO2021/046219
PCT Pub. Date: Mar. 11, 2021

(65) Prior Publication Data
US 2022/0300015 A1    Sep. 22, 2022

Related U.S. Application Data

(60) Provisional application No. 62/896,055, filed on Sep. 5, 2019.

(51) Int. Cl.
*G05D 23/19* (2006.01)
*G05B 15/02* (2006.01)

(52) U.S. Cl.
CPC ......... *G05D 23/1931* (2013.01); *G05B 15/02* (2013.01); *G05D 23/1935* (2013.01)

(58) Field of Classification Search
CPC .. F24F 11/30; F24F 11/54; F24F 11/64; F24F 11/58; F24F 2140/00; F24F 1/68; G05B 2219/2614; G05B 2219/2642; G06F 11/008; H04L 12/2803; H04L 12/2823;
(Continued)

(56) References Cited

U.S. PATENT DOCUMENTS 4,701,598 A    10/1987    Cooper
6,411,857 B1 *  6/2002    Flood ................. G06F 11/2038
                                                  714/E11.08
(Continued)

*Primary Examiner* — Darrin D Dunn
(74) *Attorney, Agent, or Firm* — Standley Law Group LLP; Adam J. Smith; Bryan P. Finneran

(57) ABSTRACT

A control arrangement for an operating system has a plurality of control devices, arranged in a sequential order. Each control device shares information, including operational condition and a real-time measurement of at least one control parameter, with at least one control device in an upstream direction and at least one control device in a downstream direction. The control arrangement also has first and second terminal control devices. The first terminal control device is positioned at a beginning of the sequential order and the second terminal control device positioned at an end of the sequential order. The first terminal control device shares information only with control devices in the downstream direction and the second terminal control device shares information only with control devices in the upstream direction. In some applications, each control device that is not a terminal control device shares information with more than one control device in each direction.

12 Claims, 3 Drawing Sheets

(58) Field of Classification Search
CPC ............. H04L 12/40123; H04L 41/082; H04L 63/065; H04B 17/382; H02J 13/0062
See application file for complete search history.

(56) References Cited

U.S. PATENT DOCUMENTS

| | | | | |
|---|---|---|---|---|
| 7,043,339 | B2* | 5/2006 | Maeda | G05B 23/0294 700/276 |
| 7,809,472 | B1* | 10/2010 | Silva | F24F 11/62 236/1 C |
| 8,036,779 | B2* | 10/2011 | Ito | F24F 11/46 700/20 |
| 8,214,061 | B2* | 7/2012 | Westrick, Jr. | H05B 47/115 700/20 |
| 8,229,559 | B2* | 7/2012 | Westendorp | A61N 1/37247 607/9 |
| 8,229,599 | B2* | 7/2012 | Nishino | F24F 9/00 700/282 |
| 8,359,112 | B2* | 1/2013 | Kephart | G06F 11/2097 714/13 |
| 8,676,219 | B2* | 3/2014 | Pratt, Jr. | G01D 21/00 455/426.2 |
| 8,762,666 | B2* | 6/2014 | Grohman | H04L 12/2823 709/221 |
| 8,788,097 | B2* | 7/2014 | Drees | H02J 13/00016 700/286 |
| 9,194,601 | B2* | 11/2015 | Kuroiwa | F24F 11/62 |
| 9,835,347 | B2* | 12/2017 | Asmus | F24F 11/30 |
| 10,001,290 | B2* | 6/2018 | Toriyama | G06F 11/1448 |
| 10,055,268 | B2* | 8/2018 | Veluswamy | G06F 11/2023 |
| 10,641,512 | B2* | 5/2020 | Otsuki | F24F 11/64 |
| 10,928,085 | B2* | 2/2021 | Gyota | F24F 11/52 |
| 11,060,749 | B2* | 7/2021 | Hur | F24F 11/54 |
| 11,218,298 | B2* | 1/2022 | Neumann | H04L 9/3073 |
| 11,536,475 | B2* | 12/2022 | Ohta | G05B 19/042 |
| 11,555,625 | B2* | 1/2023 | Murakami | F24F 11/30 |
| 2006/0282195 | A1* | 12/2006 | Robinson | F24F 11/30 700/276 |
| 2008/0178615 | A1* | 7/2008 | Yoon | F24F 11/30 454/229 |
| 2008/0185448 | A1* | 8/2008 | Kim | F24F 11/62 236/51 |
| 2008/0234869 | A1* | 9/2008 | Yonezawa | F24F 11/30 236/49.3 |
| 2013/0121704 | A1* | 5/2013 | Gall | H04B 10/25 398/116 |
| 2014/0277760 | A1 | 9/2014 | Marik et al. | |
| 2014/0358285 | A1* | 12/2014 | Aggarwal | H05B 47/105 700/275 |
| 2016/0109146 | A1* | 4/2016 | Zhang | F24F 11/30 700/276 |
| 2016/0127173 | A1 | 5/2016 | Gagnon et al. | |
| 2017/0220502 | A1 | 8/2017 | Kessler et al. | |
| 2018/0328615 | A1* | 11/2018 | Lo | F24F 11/745 |
| 2020/0235833 | A1* | 7/2020 | Zhu | H04B 1/1027 |
| 2020/0292210 | A1* | 9/2020 | Powell | F24F 11/62 |
| 2020/0386428 | A1* | 12/2020 | Matthys | G05B 15/02 |
| 2021/0072776 | A1* | 3/2021 | Honda | F24F 11/54 |
| 2022/0003447 | A1* | 1/2022 | Williams | F24F 11/46 |
| 2022/0268474 | A1* | 8/2022 | Okada | F24F 11/54 |
| 2022/0341610 | A1* | 10/2022 | Maeda | F24F 11/70 |

* cited by examiner

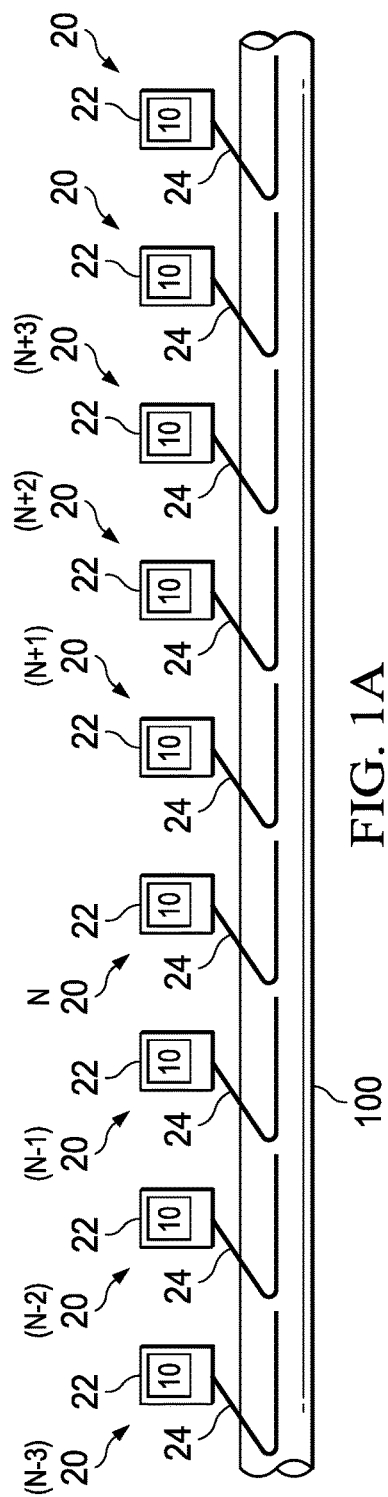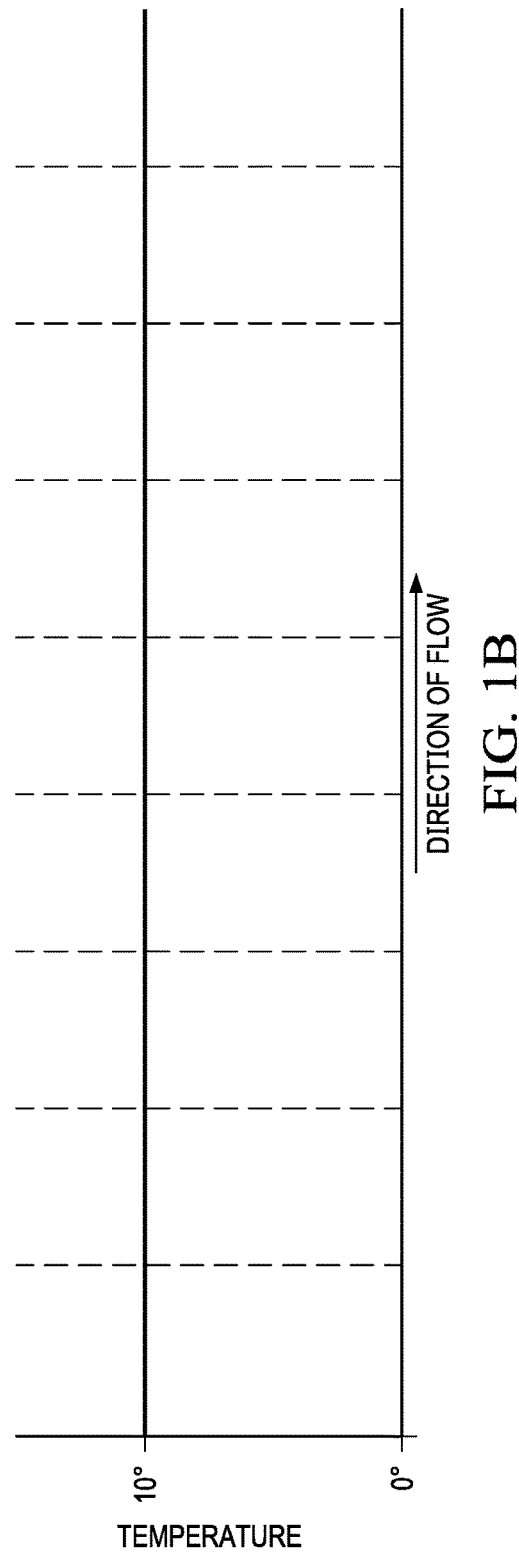

SUBSIDIARY INTERACTION OF CONTROLLERS

CROSS-REFERENCE TO RELATED APPLICATIONS

This application is a non-provisional application of U.S. provisional application 62/896,055, filed on 5 Sep. 2019, to which a claim of priority is made.

TECHNICAL FIELD

This invention relates to methods and systems of control devices arranged along a system under control, so that the individual control devices interact locally with at least one adjacent control device in a subsidiary manner, resulting in overall control of the system being maintained even if communication with a central control system fails. A particular embodiment covers temperature control along a pipeline.

BACKGROUND OF THE ART

Many systems can operate with a single system parameter being controlled by a single control device. However, when many control devices are within control of a central control unit, often remotely located, effective control can be lost if there is any disruption of the communication between the central control unit and the dispersed controllers.

It is an unmet need of the prior art to provide a control system in which a principle of subsidiarity is used to gang together local groups of control devices to locally react to system disruptions.

SUMMARY

These shortcomings of the prior art are overcome at least in part by a control arrangement for an operating system. The control arrangement comprises a plurality of control devices, arranged in the operating system in a sequential order, such that each control device shares information, comprising operational condition and a real-time measurement of at least one control parameter, with at least one control device in an upstream direction and at least one control device in a downstream direction.

In such a control arrangement, plurality of control devices further comprise a first and a second terminal control device. The first terminal control device is positioned at a beginning of the sequential order and the second terminal control device positioned at an end of the sequential order, such that the first terminal control device shares information only with control devices in the downstream direction and the second terminal control device shares information only with control devices in the upstream direction.

In some of the embodiments, each control device that is not a terminal control device shares information with at least two control devices in the upstream direction and at least two control devices in the downstream direction.

In some of any of these embodiments, the control devices are heating systems and the control parameter is temperature.

In such systems, each of the heating systems comprises a thermostat; a length of heat tracing line provided with electrical power through the thermostat; and a temperature sensor in contact with an object being heated by the length of heat tracing, the temperature sensor providing a feedback input to the thermostat.

BRIEF DESCRIPTION OF THE DRAWINGS

A better understanding of the inventive concept will be had by reference to the appended drawings, wherein identical reference numbers identify identical parts and wherein:

FIG. 1A shows a system of control devices as known in the prior art, implemented on a pipeline under normal operation;

FIG. 1B shows a temperature versus distance diagram for the system of FIG. 1A;

DETAILED DESCRIPTION OF THE PREFERRED EMBODIMENTS

Figure 2A:
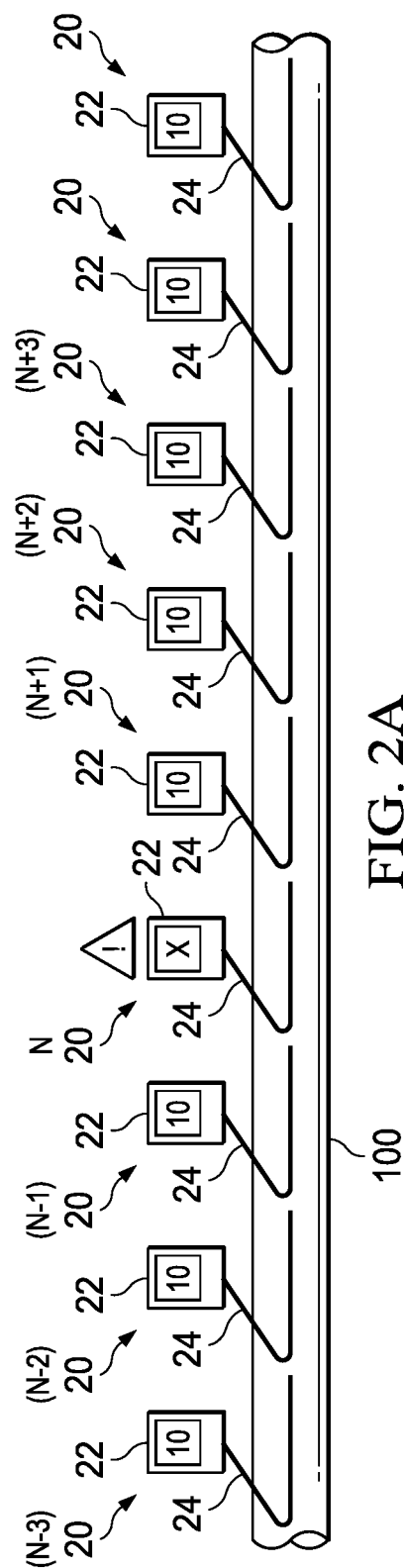
FIG. 2A shows the system of control devices of FIG. 1A, wherein a disruption has occurred in a control device in the system.
Figure 3A:
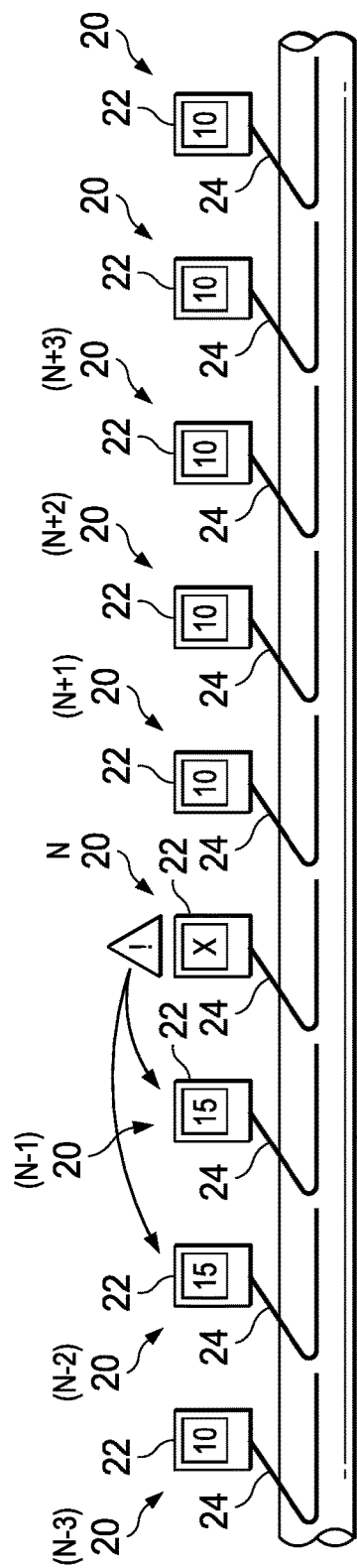
FIG. 3A shows a system of control devices incorporating the inventive concept under the same disruption as depicted in FIG. 2A.

FIG. 1A schematically depicts a section of a pipeline 100. A plurality of heating systems 20 are arranged sequentially along the pipeline 100. Each heating system 20 has a thermostat 22 and a length of heat tracing line 24. In a hypothetical such as this, the systems 20 may be arranged at intervals of approximately 200 meters. A sensor 24 is in contact with the pipeline 100 and detects a temperature of the pipeline skin, which the sensor provides as an input signal to the thermostat 22, so that the power supplied to the heat tracing 24 may be controlled. In many of the systems of this type, power is applied to maintain a setpoint temperature. In the specific illustrative example, FIG. 1B shows how temperature varies with distance along the pipeline 100 when the system is operating ideally, with the setpoint at 10° C. In actual practice, the extremely flat horizontal slope of the temperature profile is not achieved, although the excursions are probably sufficiently minimal that they may be ignored. FIG. 1B also shows a baseline at 0° C., as this a freezing temperature for water. Operation as depicted in FIGS. 1A and 1B is trivial as long as each and every heating system 20 operates nominally. In FIGS. 1A, 2A and 3A, flow of the material in the pipeline 100 is from left to right, so seven of the heating systems 20 are numbered as (N−3), (N−2), (N−1), N, (N+1), (N+2) and (N+3) for purposes of illustration.

Figure 2B:
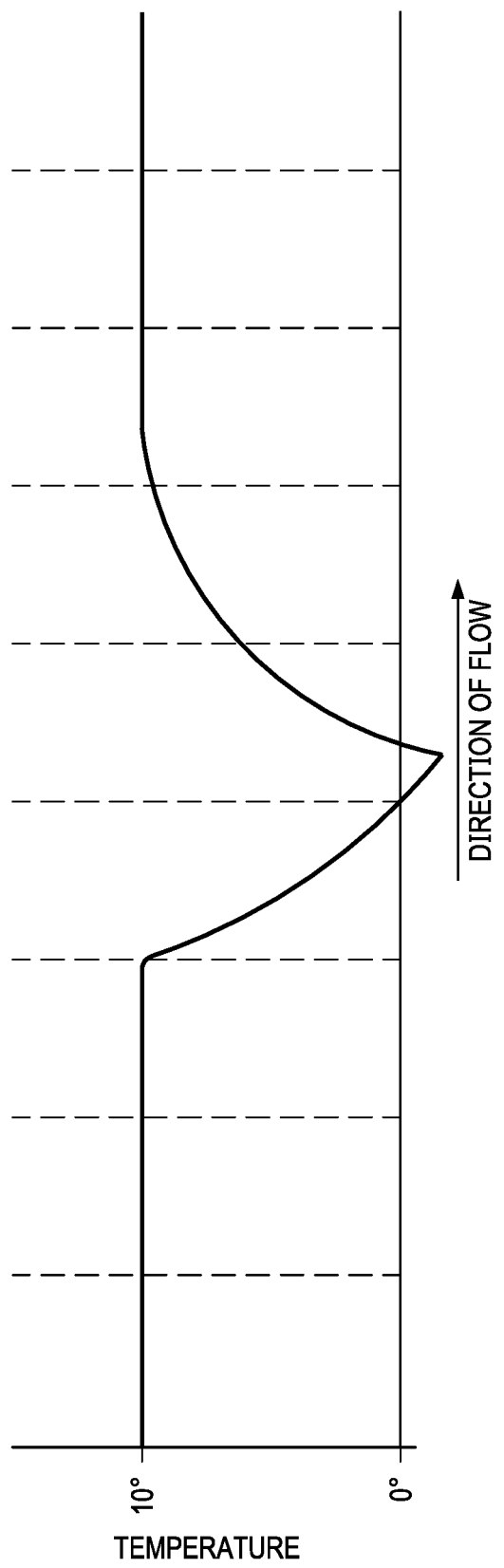
FIG. 2B shows a temperature versus distance diagram for the system of FIG. 2A, as disrupted.

A complication can arise if one or more of the heating systems 20, in this case the heating system 20 numbered as N fails to maintain the setpoint temperature. This failure, illustrated in FIG. 2A, can occur from a variety of means, but assume it is due to a fault in the power line supplying the heat tracing 24. When this occurs, as depicted graphically in FIG. 2B. temperature in the pipeline segment controlled by heating system N drops. Since the heating systems denominated as (N−1) and (N+1), that is, the adjacent heating systems, are unaware of the fault. Depending on the circumstances, pipeline temperature could drop below 0° C. and adverse results could occur. As long as heating systems 20 denominated as (N+1) and up continue to function, recovery can occur, but it may take a long distance to restore the temperature to the setpoint.

One prior art solution (not illustrated) to avoid this problem is to connect each heating system with a central controller using a communication system (e.g. Modbus) to monitor and control it. Even this system can fail if a loss in signal, to or from the heating system, occurs.

Figure 3B:
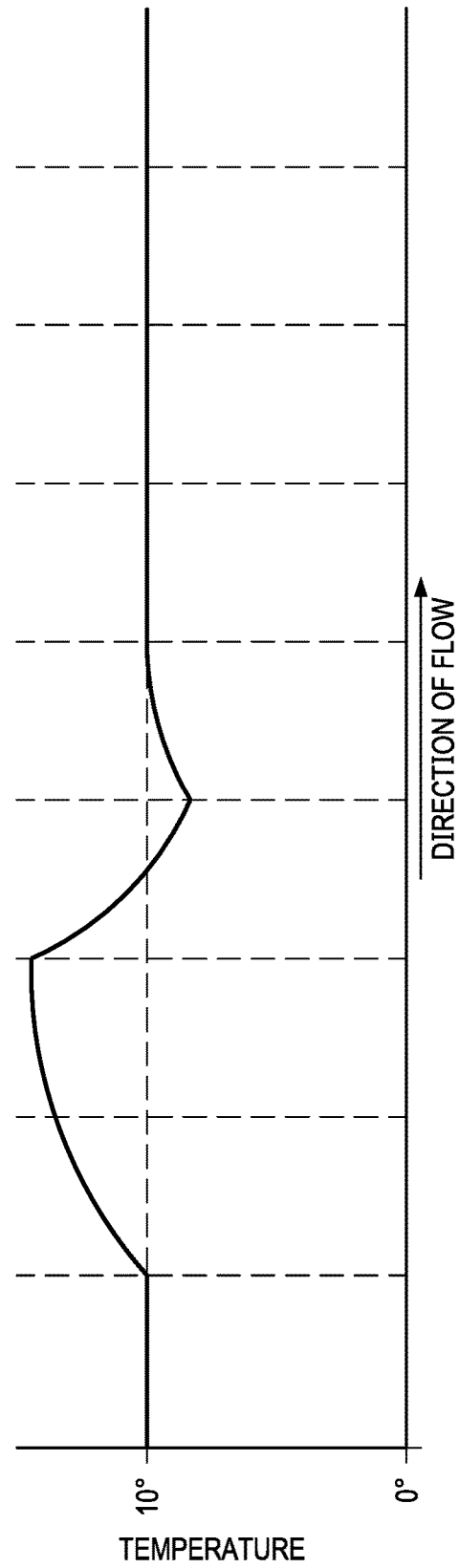
FIG. 3B shows a temperature versus distance diagram for the system of FIG. 3B, showing the effects of the subsidiary control protocol.

The inventive concept is seen in FIGS. 3A and 3B. As the temperature begins to drop in the zone of thermostat N, one of at least a few algorithms can be followed. In one of these algorithms, thermostat N receives a signal from its associated sensor and recognizes a decrease in temperature. This causes it to send a signal to at least the thermostat immediately upstream from it, that is, thermostat (N−1), that requires thermostat (N−1) to increase its setpoint by a predetermined amount. Thermostat (N−1) may also send a signal to thermostat (N−2) that requires it to increase its setpoint by a predetermined percentage of the setpoint increase that has occurred in thermostat (N−1).

In another variation of this algorithm, thermostat N, receiving a signal from its associated sensor, recognizes that the sensed temperature differs from the temperatures being sensed at the immediately adjacent temperature zones, that is, zones (N+1) and (N−1). If the difference exceeds a predetermined threshold, thermostat N sends a corrective signal in the appropriate direction. In this case, thermostat N instructs thermostat (N−1) to increase its setpoint by a predetermined amount. Thermostat (N−1) may in turn send a signal to thermostat (N−2) that requires it to increase its setpoint, based upon a comparison of the sensor signals from thermostats N and (N−2) using the same concept of comparing three spatially sequential temperatures signals, that is, the signals from thermostats (N−2), (N−1) and N.

The algorithm can extend to a situation where each thermostat in the system shares condition status information with each other thermostat. However, for practical purposes, the value of information from a remote thermostat declines significantly. For that reason, a practical limit may be to have every thermostat directly being informed by no more than four thermostats in the upstream direction and no more than four thermostats in the downstream direction. It is readily understood that the most remote of these thermostats will convey information indirectly through their connection to additional thermostats not in direct communication with the "central" thermostat in this regime.

A conventional thermostat receives a temperature signal and calculates a power output signal that is based on the temperature signal as converted to temperature and a set temperature. This system is operative regardless of whether the thermostat is a two point controller, a PID controller, a fuzzy controller, a neuro controller or another known type. When the inventive concept is applied, the additional information from additional thermostats in increasing distances upstream and downstream of the central or operating thermostat is received and appropriately discounted, based on distance (in terms of number of units) and direction (upstream or downstream). These data may be stored and used for tracking trends. This information can be usefully implemented in any of the types of controllers mentioned above.

As an example, thermostat N may operate in a standard manner if the condition data for thermostats N+1 and N+2 are unremarkable. However, if either thermostat N+1 or N+2 fails, by not reporting or indicating error, the set point in thermostat N may be raised by a predetermined amount. In another variation, if thermostat N+2 fails, the data from thermostat N+3, which might be otherwise ignored, is used in lieu of thermostat N+2. In either of these cases, thermostat N may append an indicator to its condition output signal, so that the adjacent thermostats will recognize that non-standard operation is occurring.

Of course, thermostat N may also send a signal to a remotely-located control point that it has noted a temperature difference that may indicate a malfunction in its zone of operation.

While the inventive concept is described as implemented on a system of sequentially-arranged thermostats to control temperature in a pipeline, it will be understood by one of skill in the art that the same concept may be used to maintain local control in the subsidiary manner by establishing communication between at least one adjacent control device and sharing information about at least one control parameter and the real-time condition of the control device. While temperature is a control parameter used illustratively here, many other control parameters could be used, including, for example, pressure, humidity, dissolved gas concentration and pH.

What is claimed is:

1. A control system with a decentralized arrangement for adjustably operating a system undertaking operations, said control system comprising:
   a plurality of control devices arranged in the system in a sequential order, wherein each respective control device of the plurality of control devices is configured to:
   determine information at the respective control device comprising operational condition and a real-time measurement of at least one control parameter of the respective control device; and
   share the information determined at the respective control device with at least one of the plurality of control devices in an upstream direction from the respective control device and at least one of the plurality of control devices in a downstream direction of the respective control device such that each of the plurality of control devices receive information shared from a different combination of the plurality of control devices; and
   upon receipt of the information from at least one other one of the plurality of control devices at the respective control device indicating an out-of-tolerance condition, adjust an operational setpoint of said respective control device to a modified operational setpoint in accordance with the information received at the respective control device from the at least one other one of the plurality of control device;
   wherein the control devices comprise heating systems and the control parameter comprises temperature; and
   wherein each of the heating systems comprises a thermostat, a length of heat tracing line provided with electrical power through the thermostat, and a temperature sensor in contact with an object of the system to be heated by the length of heat tracing, the temperature sensor configured to provide a feedback input to the thermostat.

2. The control system of claim 1, further comprising:
   a first and a second terminal control device, the first terminal control device positioned at a beginning of the sequential order and the second terminal control device positioned at an end of the sequential order, such that the first terminal control device shares information only with at least one of the control devices in the downstream direction and the second terminal control device shares information only with at least one of the control devices in the upstream direction.

3. The control system of claim 1, wherein:
   each of the control devices and each of the terminal control devices shares information with at least two of the control devices in the upstream direction and at least two of the control devices in the downstream direction.

4. The control system of claim 1, wherein:
the information received at the respective control device from another of the plurality of the control devices comprises a value for the control parameter outside of a predetermined acceptable range; and
the respective control device is configured to adjust an amount of energy applied to the system.

5. The control system of claim 4, wherein:
the information received at the respective control device from another of the plurality of the control devices comprises a temperature value below a floor of the predetermined acceptable range; and
the respective control device is configured to increase the energy applied at the heating element.

6. The control system of claim 4, wherein:
the information received at the respective control device from another of the plurality of the control devices comprises a temperature value above a ceiling of the predetermined acceptable range; and
the respective control device is configured to decrease the energy applied at the heating element.

7. The control system of claim 1, wherein:
the information received at the respective control device comprises a non-functionality indicator for the operational condition.

8. The control system of claim 7, wherein:
the respective control device is configured to increase the energy applied at the heating element.

9. The control system of claim 1, wherein:
the control parameter comprises a pressure.

10. The control system of claim 1, wherein:
each respective control device is configured to set the operational setpoint based on the information determined at the respective control device.

11. A control system for maintaining and adjusting operational control of a system undertaking operations in a decentralized fashion, said control system comprising:
a plurality of control devices for the system, each of the plurality of control devices comprising at least one sensor for measuring an operating parameter of the system and at least one energy application device for applying energy to the system to move the system from a current state, wherein each of the plurality of control devices are arranged in a sequential, series order at the system, and wherein each respective control device of the plurality of control devices is configured to:
receive data from the at least one sensor;
determine at least one control parameter from the data received from the at least one sensor;
algorithmically determine based, at least in part, on the at least one control parameter and an operational setpoint for the respective control device an amount of energy to apply at the at least one energy application device;
command application of the amount of energy at the at least one energy application device;
share the at least one control parameter of the respective control device with at least one control device of the plurality of control devices in an upstream direction from the respective control device in the sequential, series order and at least one control device of the plurality of control devices in a downstream direction of the respective control device in the sequential, series order such that each respective control device receives the information from a different combination of the plurality of control devices;
upon receipt of the information from at least one other one of the plurality of control devices indicating at least one of the at least one control parameter at an out-of-tolerance condition or a non-standard operational status, adjusting the operational setpoint of said respective control device to a modified operational setpoint in accordance with the information received at the respective control device from the at least one other one of the plurality of control devices;
algorithmically determine based, at least in part, on the at least one control parameter and the modified operational setpoint a modified amount of energy to apply; and
command application of the modified amount of energy at the at least one energy application device.

12. A control system with a decentralized arrangement for adjustably operating a system undertaking operations, said control system comprising:
a plurality of control devices arranged in the system in a sequential order, wherein each respective control device of the plurality of control devices is configured to:
determine information at the respective control device comprising operational condition and a real-time measurement of at least one control parameter of the respective control device; and
share the information determined at the respective control device with at least one of the plurality of control devices in an upstream direction from the respective control device and at least one of the plurality of control devices in a downstream direction of the respective control device such that each of the plurality of control devices receive information shared from a different combination of the plurality of control devices; and
upon receipt of the information from at least one other one of the plurality of control devices at the respective control device indicating an out-of-tolerance condition, adjust an operational setpoint of said respective control device to a modified operational setpoint in accordance with the information received at the respective control device from the at least one other one of the plurality of control device;
wherein the information received at the respective control device from another of the plurality of the control devices comprises a value for the control parameter outside of a predetermined acceptable range; and
wherein the respective control device is configured to adjust an amount of energy applied to the system;
each of the plurality of control devices comprises a thermostat and a heating element;
the information received at the respective control device from another of the plurality of the control devices comprises:
a temperature value below a floor of the predetermined acceptable range wherein the respective control device is configured to increase the energy applied at the heating element; or
a temperature value above a ceiling of the predetermined acceptable range, wherein the respective control device is configured to increase the energy applied at the heating element.

* * * * *